(12) United States Patent
Redford (10) Patent No.: US 6,241,160 B1
(45) Date of Patent: Jun. 5, 2001

(54) ATMOSPHERIC INVERSION LAYER DE-STABILIZER APPARATUS

(76) Inventor: Daniel S. Redford, 5270 Elvira Rd., Woodland Hills, CA (US) 91364

( * ) Notice: Subject to any disclaimer, the term of this patent is extended or adjusted under 35 U.S.C. 154(b) by 0 days.

(21) Appl. No.: 09/068,696
(22) PCT Filed: Apr. 15, 1996
(86) PCT No.: PCT/US96/05121
§ 371 Date: May 13, 1998
§ 102(e) Date: May 13, 1998
(87) PCT Pub. No.: WO97/38570
PCT Pub. Date: Oct. 23, 1997

Related U.S. Application Data
(60) Provisional application No. 60/013,814, filed on Mar. 21, 1996.

(51) Int. Cl.[7] .................................................. A01G 15/00
(52) U.S. Cl. .................................................. 239/14.1
(58) Field of Search .................... 239/2.1, 14.2; 244/114, 136; 203/49

(56) References Cited

U.S. PATENT DOCUMENTS

| | | | |
|---|---|---|---|
| 3,748,867 | * 7/1973 | Bel Hamri | 62/271 |
| 3,974,756 | * 8/1976 | Long | 98/58 |
| 5,295,625 | * 3/1994 | Redford | 239/14.1 |
| 5,322,219 | * 6/1994 | Esplin | 239/171 |

* cited by examiner

Primary Examiner—Lesley D. Morris
Assistant Examiner—Lisa Ann Douglas
(74) Attorney, Agent, or Firm—Albert O. Cota (57) ABSTRACT

An atmospheric inversion layer de-stabilizer apparatus is using the energy of the water vapor present in the earth's atmosphere to destabilize an atmospheric inversion layer, as a way and to disperse the air pollutants concentrated below the inversion layer, in time to prevent photochemical reactions and smog formation. The apparatus may also be used to alleviate frost, disperse fog, and control the atmosphere's composition above of a limited geographic area. The apparatus is using a ring balloon (26) filled with lighter than air gas, to elevate vertically in the atmosphere an air transport shuttle (42), and a control platform (122) to control the altitude and the ascending and descending speed of the air transport shuttle (42) via a vertical cable (102) attached to the air transport shuttle (42) and wound on a motorized reel (146).

5 Claims, 5 Drawing Sheets

ATMOSPHERIC INVERSION LAYER DE-STABILIZER APPARATUS

This application was originally filed as a Provisional Patent Application Ser. No. on Mar. 21, 1996 and was assigned Ser. No: 60/013,814.

TECHNICAL FIELD

The present invention relates to an apparatus that uses the solar energy accumulated and transported by atmospheric water vapor, to generate air convection passages through an inversion layer. More specifically, to an apparatus that cyclically releases bellow an atmospheric inversion layer, large dry air bubbles warmer than the surrounding air, to cut air convection passages in the inversion layer, and to allow the air trapped below it to rise naturally.

BACKGROUND ART

The Atmosphere physics reveals how the temperature of the troposphere decreases with the increase in altitude, with the warm air close to the ground level constantly rising until its temperature drops to that of the surrounding air. When under special conditions, this altitude/air temperature relationship is changed, such as when a cool, stable air mass is trapped below a relatively warmer and also stable air, it creates an atmospheric condition known as an "inversion layer".

In areas affected by this atmospheric condition, the vertical air current that mixes the polluted air from the lower altitude with the relatively cooler and cleaner air at the higher altitude is suppressed. This will result in the accumulation of a high concentration of pollutants bellow the inversion layer, and the formation of the photochemical smog.

Photochemical smog originates from nitrogen oxides and hydrocarbon vapors emitted by industry, automobiles, and other sources, which then undergo photochemical reactions in the lower atmosphere. The highly toxic ozone gas arises from the reaction of nitrogen oxides with hydrocarbon vapors in the presence of sunlight, and some nitrogen dioxide is produced from the reaction of nitrogen oxide with sunlight. The resulting smog causes a light-brownish coloration of the atmosphere, reduced visibility, plant damage, irritation of the eyes, and respiratory distress.

The amount of time the smog generating substances are trapped below an atmospheric inversion layer plays a major role in the formation of photochemical smog. The photochemical reactions require the presence of light for at least four to six hours.

It is the objective of the present invention, to use the energy of the atmospheric water vapor, to de-stabilize an atmospheric inversion layer and to disperse the air pollutants concentrated below the inversion layer in time to prevent photochemical reactions and smog formation.

A search of the prior art did not disclose any patents that uses the latent energy of the atmospheric water vapor trapped below an inversion layer to cyclically generate large thermal air bubble as a way to de-stabilized the inversion layer, however, the following U.S. patents are considered related:

| U.S. Pat. No. | INVENTOR | ISSUED |
|---|---|---|
| 3,974,756 | Long | Aug. 17 1976 |
| 5,295,625 | Redford | Mar. 22 1994 |

Long teaches an apparatus and method for field burning and fog or smog control. In certain agricultural areas, crops that have been harvested and before the next season are normally burned to sterilize the land and decontaminate the area of unwanted seeds and vermin. The normal method is to simply burn the residual vegetation from the field. The smoke containing particulate matter is dispersed at a low altitude, creating a menace to the urban population. Long's invention utilizes a long, segmented, high altitude flue of flexible light-weight material, suspended vertically by a gas-filled balloon. The flue tapers upwards from an extremely large bottom opening through which the smoke enters. The stack is adjustable in height and is made of fireproof material. A rigid wall enclosure elevated above the ground level and refire grids of refractory materials are used to minimize the escape of combustible materials. Cables connects both the enclosure and balloon, and are held by winch equipped ground vehicles.

Redford teaches a long, hollow, cylindrical apparatus suspended in the atmosphere that continuously promotes convective air movement inside it, as a way to gather, transport and distribute condensed water from the water vapor present in the air moving inside. The apparatus is held in the atmosphere by circular ring balloons positioned along its height. The Apparatus' operational altitude in the atmosphere is controlled by a vertical cable wound on a motorized reel attached to the ground. A balloon enclosure suspends the upper part of apparatus' convective lifting column as well as a tubular sleeve containing water condensation surfaces. These condensation surfaces can condense the water present in the water vapor moving inside the apparatus. This water can be dispersed as a controlled rain for micro climate control purposes.

DISCLOSURE OF THE INVENTION

The apparatus and function of the present invention are directed to employing a large diameter, tall, hollow, air transport shuttle, suspended in the atmosphere by a large diameter helium ring balloon positioned around shuttle's body, and a vertical cable to connect the air transport shuttle to an altitude control winch.

The air transport shuttle is designed to hold a large volume of air inside its body and to isolate the air inside from the surrounding atmosphere.

Using the best accumulator and vehicle to transport solar energy—the atmospheric water vapor—the apparatus addresses current major ecological problems on a scale never before attempted. As an inversion layer de-stabilizer, the apparatus loads a large volume of humid air located in or below an atmospheric inversion layer, and shuttles it to high altitudes in the atmosphere for the purpose of heating and de-humidifying. The large quantity of caloric energy released naturally into the air inside the apparatus during the en-mass water vapor condensation process, is used to heat the air inside the apparatus.

When the apparatus returns to an altitude below the inversion layer, it releases one or more large diameter "thermal" bubbles, that are dryer and warmer than the surrounding air. These "thermal" bubbles, will rise rapidly in the atmosphere, and will "cut" air convection passages in the inversion layer above. These "holes" will permit the air trapped below to rise naturally through the inversion layer.

The apparatus is using a 100% renewable, cost-effective alternative source of energy, to de-stabilize an atmospheric inversion layer and to disperse the air pollutants concentrated below it in time to prevent photochemical reactions and smog formation. The apparatus can also be used to alleviate frost, and to disperse fog. When equipped with an optional equipment that converts the water droplets into condense water, the apparatus can facilitate water formation in non-raining clouds, and can control the atmosphere's composition above of a limited geographic area. In its most basic form the apparatus comprising:

- an air transportation means, for loading and vertically transporting a volume of air between two different altitudes in the atmosphere,
- a suspending means for holding and elevating the air transportation means in the atmosphere, and
- an altitude control means for controlling the ascending and descending speed as well as the position of the air transportation means in the atmosphere.

The effect of the apparatus shuttling air vertically through an atmospheric temperature inversion layer between two different altitudes, will de-stabilize this temperature inversion layer by creating air convection passages varying from 100 to 1000 feet in diameter.

To explain how and why the apparatus works, a review of some atmosphere physics is in order.

Water vapor comprises up to 4% of the earth's atmosphere by volume (about 3% by weight) near the surface. Water vapor is supplied to the atmosphere by evaporation from surface water or by transpiration from plants. Water vapor is a dry gas resembling other atmospheric gases as long as it remains gaseous. The "moisture-holding" capacity of the atmosphere is indicated by the relative humidity. This expresses the actual moisture content of a volume of air, as a percentage of quantity of water vapor contained in the same volume of saturated air at the same temperature. The heat carried away from a body of water, when the water vapor is produced, is called the "latent heat" of evaporation. Considering that the heat stored by the atmospheric water vapor during the evaporation process is nothing else than a form of solar energy, and the fact that a great part of the re-radiated sun energy by the Earth's surface is absorbed by the water vapor in the atmosphere, the water vapor is the best "solar energy accumulator" and "heat mover" on Earth.

Condensation, is the evaporation's reverse process and occurs when the temperature of the moist air is lowered in order to reduce its moisture-holding capacity. During the process of condensation, the solar energy "stored" in the water vapor is released to the environment in form of heat. In order to initiate water vapor condensation, aside from a lower air temperature, there must be present a sort of "condensation nucleus" which is not a normal constituent of pure air. There is an abundance of such nuclei in the lower atmosphere. They may consist of smoke, pollen, dust, or other particulate matter which may furnish a comparatively large mechanical surface for vapor to condense on. If chemical substances, for which water has an affinity, are used as condensation nucleus, the condensation is called chemically, rather than mechanically. Most condensation nuclei ensure the onset of condensation at or about 100% relative humidity. Some of them, however, have such an affinity for water that condensation may be initiated when the relative humidity is as low as 80%. Such nuclei are called hydroscopic, "water seeking", and in a majority of cases nuclei of this nature are found principally in industrial fumes and in the exhaust gases of automobiles.

For a gaseous system similar to the Earth's atmosphere, a change of state such as compression or expansion, is called "adiabatic" when no heat need to be added to or extracted from the system during the process. Essentially, all large scale vertical motion in the atmosphere involves adiabatic expansion or compression. A parcel of dry air which begin to ascend, it has an initial temperature and pressure, and it occupies a certain volume. At it ascends the surrounding air pressure became lower. The volume of the air parcel increases and this expansion represents work done against the environment. And since no energy enters the system to compensate for the work done, the internal energy has to decreases in accordance with the energy conservation law. This will translate in cooling of the air parcel. The expression "dry air" means air that is not saturated and that contains no liquid or solid water products. In troposphere, the dry adiabatic rate is found to be approximately 5.5 degrees Fahrenheit per 1000 Ft.

When the ascending air parcel contains saturated water vapor, the cooling rate will be only 3 degrees Fahrenheit per 1000 Ft, and is called the moist-Adiabatic rate. The latent heat released during the vapor condensation phase, makes the air temperature of the air parcel to decrease at a slower rate.

Thermodynamcally, the apparatus described in the present invention, is a "De-humidifying Heat Pump" working in the reversed Brayton Cycle. Four thermnodynamc distinctive phases can be identified in the apparatus' operation:

Phase #1 called "The Ascending Phase" or "The Moist Adiabatic Expansion Cooling", starts when the apparatus's air transport shuttle, loads humid air in the proximity of an atmospheric inversion layer, and rises up powered by its helium balloons. During this Ascending Phase, when the air inside the air transport shuttle is "cooled by expansion" the water vapor condensation begins. The air transport shuttle creates the favorable common circumstances required for the water vapor to begin condensation, namely a lower temperature and the presence of condensation nuclei, such as smog particles or other aerosols present in the air inside. The "en mass" condensation of the saturated water vapor which is taking place in the air inside the air transport shuttle, will promote the formation of the "warm fog"—a visible aggregate of minute "water droplets" suspended in the air. These water droplets are similar to the ones found in clouds, and are generally no larger than 20 microns in diameter and are approximately 100 times smaller than a typical rain drop. The water vapor's condensation latent heat, constantly released inside the air transport shuttle during this ascending phase, makes the temperature inside the shuttle to decrease at a rate slower than the dry adiabatic one. This cooling rate is the moist-adiabatic lapse rate and is 3 degrees Fahrenheit per 1000 feet.

Phase #2, called "The Water Droplet Separation Phase" or "The Condense Removal", occurs when the air transport shuttle reaches the end of its ascending phase, and the water droplets formed inside are released into the surrounding atmosphere. Because the air shuttle ascends and rotates simultaneously around its vertical axis, the water droplets are naturally separated at the bottom of the air shuttle. A remote control valve releases of the water droplets into the atmosphere.

Phase #3, called "The Descending Phase" or "The Dry Adiabatic Compression Heating", begins when the air transport shuttle starts to descend. During this phase the air inside the air transport shuttle is heated following the dry-adiabatic lapse rate. Because the condensed water vapor present at the end of the ascending phase were separated and remove from the system, no evaporation can take place inside the air transport shuttle. As a result, the air inside the air transport shuttle is heating up at the dry-adiabatic lapse rate feet of 5.5 degrees Fahrenheit per 1,000 feet. When the apparatus reaches the initial air loading altitude, the air temperature inside the air shuttle is warmer than the surrounding air. For each 1,000 feet of vertical shuttling distance, the air inside the air transport shuttle will return 2.5 degrees warmer than the surrounding air. If the air transport shuttle will shuttle the air vertically for 10,000 feet, the air inside will return at the loading point 25 degrees Fahrenheit warmer: $\Delta T=(5.5-3) \times 10,000/1,000=25.0° F$.

Phase #4, called "The Dry-Warm Air Downloading Phase" or "The Thermal Generation", begins when the desired descending altitude was reached, and the air transport shuttle releases one or more large "thermals" air bubble, bellow the inversion layer. These large diameter bubbles are warmer and dryer than the surrounding air, and are similar in nature to the warm air "thermals" formed on land below a weak inversion layer during hot summer days. Operating in the same manner as a natural "thermal", the air bubble released by the air transport shuttle pushes aloft the colder air above it, thus mixing the colder "inversion layer" with the warmer air above. In addition, the cold air sinking around the periphery of the rising bubble, erodes the bubble away in the process. A "wake" of turbulently mixed air is formed beneath a rising bubble. These combined actions will destabilized the inversion layer and will create air convection passages through it.

One medium size apparatus will shuttle and release up to 250,000 cubic feet of air every six to ten minutes, and can create and maintain 100 feet to 1000 feet diameter "dry air convection passage" in the inversion layer.

In this way, the present invention diligently enhances nature rather than re-inventing it. Using the best "accumulator" and "Vehicle" to transport solar energy—the water vapor—the apparatus addresses current major ecological problems on a scale never before attempted, and introduces the means to counteract the damaging effect of the technological era on the environment. The water vapor energy unchained by the apparatus, is renewable, cost effective, 100% controllable, and non-polluting. It is unmatched by any form of energy known today.

The apparatus operates as a "heat pump" in a reversed Bryaton cycle, using only a small fraction of the energy utilized today by the existing fog removal, frost prevention, or smog control. The energy required to operate the apparatus is estimated to be between 10 to 15 KWh.

The apparatus' conventional energy savings is calculated considering the thermal and mechanical energy necessary to heat and elevate through an inversion layer, the volume of air contained in the "thermals" dry air bubbles released by the apparatus in one hour of operation. Under this scenario, the thermal energy required to generate 250,000 cubic feet of warm air, 25 degrees Fahrenheit warmer than incoming air, every 6 minutes, and with no change in relative humidity (incoming air relative humidity 60%) may be calculated with the following formula:

$$Q=cfm\ (60)(0.075)(0.24+045W)\Delta T[Btu/hr]$$

where:
cfm=volume flow rate through the system [ft³/min]
cfm=250,000 ft³/6 min=41,667 [ft³/min]
60=conversion factor from [min] to [hr]
0.075=dry air density [lbm/ft³]
0.24=specific heat of dry air [Btu/lbm*R]
0.45=specific heat of water vapor [Btu/lbm*R]
W=humidity ratio, lb. of water per lb. of dry air
W=0.0152 for 60% relative humidity and 14.696 psia
$\Delta T$=Temperature difference between the incoming and the exiting air flowing at ASHRAE standard conditions.
$\Delta T$=25 [°F.]

$$Q=41,667*60*0.075*(0.24+0.45*0.0152)*25=1,157,071\ [Btu/hr]$$

Considering the thermal efficiency of the air heating system $\eta=0.28$, the "Thermal Energy" used is: $Q_R=Q/\eta$, or 4,132,397 [Btu/hr]

If propane is used as the conventional source of energy, with its Lower Heating Value of 19,935 [Btu/lbm] and $1.20 per lbm retail price, the Direct Thermal Energy savings per hour is $249.00. The Thermal Energy savings per year, per apparatus may reach: $2,175,264

The mechanical energy costs required to operate a light weight helicopter that generates and maintains 100 feet diameter vortex bellow and through an inversion layer are conservatively estimated at $34.00 per hour of operation. Mechanical Energy savings per year, per apparatus may reach: $297,840. The total direct conventional energy saving is $2.473 Millions per year, per apparatus.

Theoretical bibliographical background may be found in the following:
INTRODUCTION TO METEOROLOGY
Second Edition
FRANKLIN W. COLE
Professor of Meteorology and Engineering, Foothill College
Los Altos Hills, Calif.
JOHN WILEY & SONS, INC.
New York, London, Sydney, Toronto 1976
ATMOSPHERE, WEATHER and CLIMATE
Fourth edition
Roger G. Barry and Richard J. Chorley
Methuen, London and New York 1982
ENGINEERING THERMODYNAMICS
First Edition
DWIGHT C. LOOK, Jr. & HARRY J. SAUER, Jr.
University of Missouri-Rolla
PWS ENGINEERING, BOSTON 1987
The ATMOSPHERE, an Introduction to Meteorology,
Second edition
FREDERICK K. LUTGENS and EDWARD J. TARBUCK
Illinois Central College
PRENTICE-HALL, Inc., 1982, New Jersey, London, Tokyo It is, therefore, a principal objective of the present invention, to use the energy of the atmospheric water vapor, to de-stabilize an atmospheric inversion layer and to disperse the air pollutants concentrated below the inversion layer in time to prevent photochemical reactions and smog formation.

It is an additional objective of the present invention generate large thermal air bubbles, closed to the ground, to alleviate frost, to disperse fog, and to control the atmosphere composition above a limited geographical area.

It is a further objective of the present invention to disperse the water droplets released from the apparatus in the form of a fine mist, for atmospheric filtration purposes.

Figure 6:
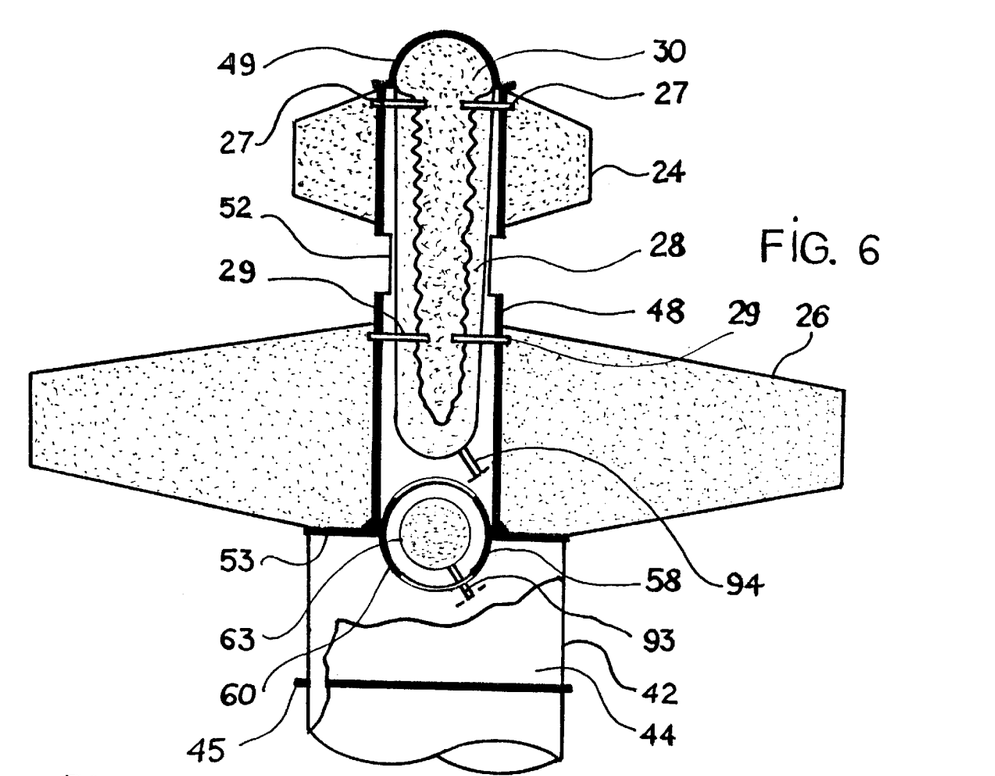

These and other objectives and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is an elevation view of the preferred embodiment, elevated at its position in the atmosphere below an inversion layer, loading cold air and releasing a warmer thermal air bubble, with arrows depicting the air flow direction outside the invention.

FIG. 2 is an elevation view of the preferred embodiment, completely extended into the upper atmosphere.

FIG. 3 is a partial isometric view of the preferred embodiment, showing the auxiliary balloon enclosure and giro-sails, removed from the invention for clarity.

FIG. 4 is a partial cross-sectional view of the preferred embodiment, showing the air supply and control system with the air pump in an extended position, completely removed from the invention for clarity.

FIG. 5 is a partial, cross-sectional view of the preferred embodiment, showing the air supply and control system with the air pump in a contracted position, completely removed from the invention for clarity.

FIG. 6 is a partial, cross-sectional view of the preferred embodiment, showing the invention suspending means, completely removed from the invention for clarity.

FIG. 7 is a diagram of the preferred embodiment's air supply distribution and control system.

BEST MODE FOR CARRYING OUT THE INVENTION

Features and advantages of the present invention will be enhanced and better understood upon consideration of the following description of the best mode for carrying the invention in conjunction with the accompanying drawings.

It should be understood by one skilled in the art, that the apparatus's direction of rotation, the position of the balloon enclosures, the position of the giro-salls, the position of the air intake and air exhaust valves, as well the position of the apparatus altitude control system are not restricted to those described.

The preferred embodiment as shown in FIGS. 1 through 7 is comprised of an air transportation means 40, a suspending means 20 for holding the invention in the atmosphere and an altitude control means 80.

The air transportation means 40 comprising a hollow air transport shuttle 42, that isolates the air inside from the ambient air. The air transport shuttle 42, consists of hollow cylindrical flexible structure 44, attached in an airtight manner to a circular flange support 53, as illustrated in FIG. 6. A plurality of rigid rings 45, shown in FIGS. 1, 2 and 6, are employed to hold a circular shape for the flexible structure 44. Furthermore, the air transport shuttle 42 has on a lower portion, a conical column 50. The conical column 50 is used to increase or decrease the volume of the air transport shuttle 42, in order to keep the air pressure inside the air transport shuttle 42, in balance with the surrounding atmospheric pressure. The air shuttle 42 has an air intake valve 56 positioned on a lower portion of the conical column 50 as illustrated in FIG. 2, and an air exhaust valve 58 positioned on a higher portion of the air transport shuttle 42, as shown in FIG. 6. The air valves 56 and 58 are similar in construction. As shown in FIG. 6, the air exhaust valve 58 has a light-weight rigid structure 60, and an inflatable valve-pilot 63. The air intake valve 56, shown in FIG. 2, has a light-weight rigid structure 61 and an inflatable valve-pilot 62. The air intake valve 56, and the air exhaust valve 58 are open during air loading, and thermal air bubble release operations. A supporting net 84, attached to the air transport shuttle 42, is terminated on its lower part with a rigid structure 36, as illustrated in FIGS. 1, 2, 4 and 5. FIGS. 4 and 5 are shown an air pump assembly 100 attached to the rigid structure 36, an air pump controller 130, a pump body 101, and a pump wall 31. The air pump controller 130, is equipped with a spring-loaded hydraulic cylinder 34, that is attached to the rigid structure 36, by an annular rings 148, and a ring 50, as illustrated in FIG. 4. A piston 33 is attached to a shaft 32, and is positioned inside the hydraulic cylinder 34. A spring 35 is forcing upward the piston 33, into the cylinder 34, as shown in FIGS. 4 and 5. A remote controlled on/off valve 38 positioned in-line in a hydraulic circuit 39, controls the position of the piston 33, the shaft 32, and the air pump wall 31, in relation to the cylinder 34, as illustrated in FIGS. 4 and 5. A cable 102 is attached by an ending 104, to a bearing 110, located in a housing 106, as depicted in FIGS. 4 and 5. The housing 106 is attached to the pump wall 31. The bearing 110 allows the air transport shuttle 42 to rotate freely around the cable 102.

The suspending means 20 consists of an auxiliary balloon enclosure 24, a circular ring balloon 26, and cylindrical balloon 30. At lower altitudes, only the auxiliary balloon enclosure 24 and the ring balloon 26, are filled with lighter than air gases. The cylindrical balloon 30 is empty, and is positioned inside an air balloon enclosure 28. A tower 48 is housing the balloon enclosure 28 and the cylindrical balloon 30. The tower 48 has on its extreme upper part a semi-spherical cap 49, to reduce the air resistance during ascending movements. Furthermore the tower 48 is permanently attached to the circular flange support 53 as illustrated in FIG. 6. The auxiliary balloon enclosure 24 and the ring balloon 26 are mounted around the tower 48. Air exhaust windows 52 are provided in the tower 48. The air exhaust valve 58 is attached to the lower part of the tower 48. The auxiliary balloon enclosure 24, when filled with lighter than air gas, will support its own weight, the weight of the tower 48, and the weight of the balloons 28 and 30. In addition, the auxiliary balloon enclosure 24 is employed to shape the warm air exiting the air transport shuttle 42, through the exhaust windows 52, into large diameter thermal air bubbles, as illustrated in FIG. 1. The circular ring balloon 26 when filled with lighter than air gas will supply the necessary lifting force to ascend the air transport shuttle at a higher altitude in the atmosphere. As illustrated in FIGS. 1, 2 and 3, the auxiliary balloon enclosure 24 and ring balloon 26 are provided with gyro-sails 10. The gyro-sails 10 will permit the apparatus to rotate in the same direction during ascending and descending phases and to gyroscopically stabilize its movements in the atmosphere. The ring balloon 26 and the auxiliary balloon enclosure 24 are not allowed to modify their volume during ascending or descending periods. To compensate for this restriction, umbilical tubes 27 connects the cylindrical balloon 30, to the balloon enclosure 24. Also the balloon 30 is connected to the ring balloon 26 with umbilical tubes 29. During the apparatus ascending phase, the lighter than air gas inside the balloon enclosure 24 and ring balloon 26 is allowed to expend into the cylindrical balloon 30. The balloon 30 is returning back the lighter than air gas during the descending phase, when the balloon 28 is pressurized and squeezes the cylindrical balloon 30 inside. In this way the suspending means 20 will continue to deliver the same ascending force even when the surrounding air density decreases. The auxiliary balloon enclosure 24, the circular ring balloon 26, and the cylindrical balloons 28 and 30, shown in FIG. 6, are well known in the art for their type of construction and material.

Figure 1:
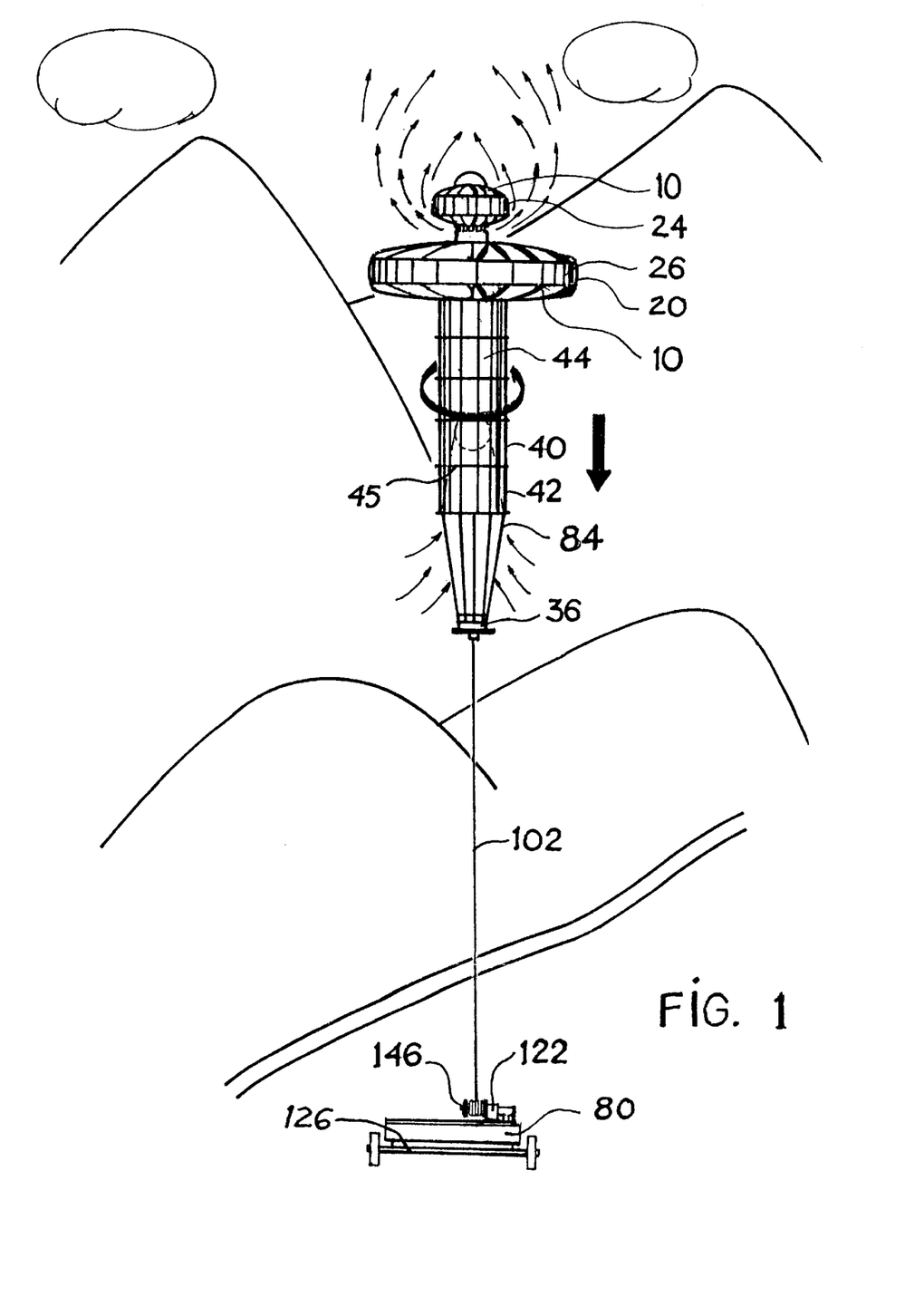

The suspending means 20 has enough lifting ability to pull and accelerated the air transport shuttle 42 into the atmosphere. A control platform 122, controls the altitude position of the air transport shuttle 42 in the atmosphere, and regulates shuttle's (42) ascending and descending speed. The control platform 122 consists of the vertical cable 102, having a first end attached to the housing 106, and a second end wounded around a cable length control mechanism in the form of a motorized reel 146, that is rigidly attached to a stationary (not shown), or a moving platform 126 on a ground surface, as depicted in FIG. 1. The motorized reel 146 contains a brake and has sufficient torque to overcome the ascending force developed by the suspending means 20, and to wind the cable 102 around the reel 146. During its operational phases, the air transport shuttle 42, rotates freely around its vertical axis. This rotation, generated by the sails 10 when the air transport shuttle ascends or descends in the atmosphere, increases shuttle's stability in the atmosphere due to a gyroscope effect, and creates a suction whirlpool effect through the inversion layer.

Figure 4:
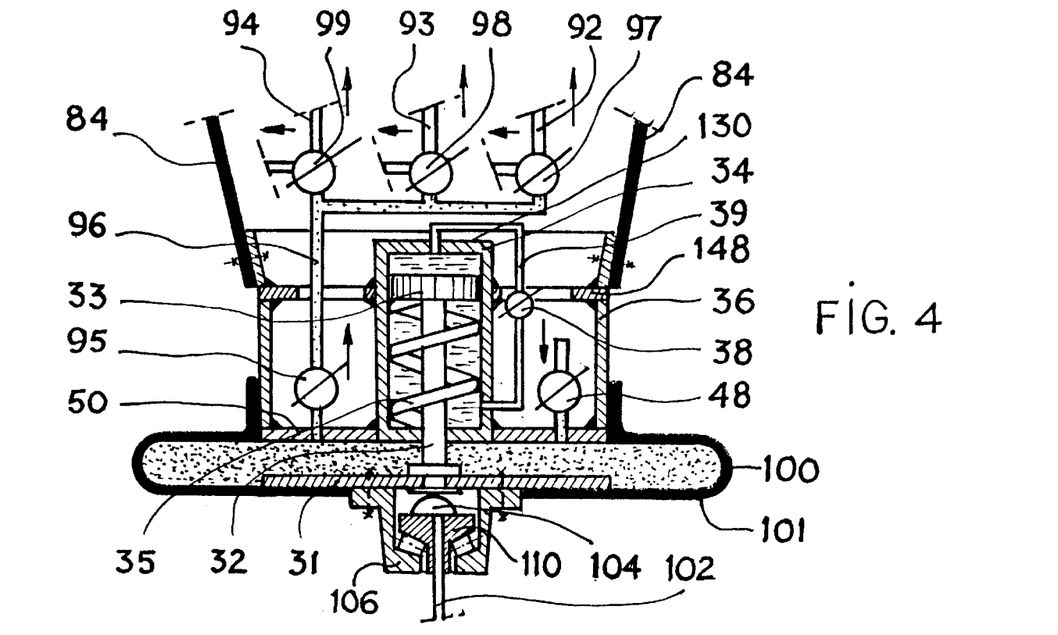

During the apparatus operational phases, pressurized air is used to close and open the air valves 56 and 58, and to control the volume of cylindrical balloon 30 positioned inside the balloon enclosure 28. The pressurized air is supply by the air pump 100 and is distributed and controlled as shown in the diagram depicted in FIG. 7. In this diagram, the air pump 100, that is controlled by the air pump controller 130, supplies pressurized air through a one way valve 95, via an air transport line 96, into radio controlled 3-way valves 97, 98, and 99, and from there, via umbilical tubes 92, 93 and 94, to the cylindrical balloon enclosure 28, the air intake valve-pilot 62, and the air exhaust valve-pilot 63. The radio controlled 3-way valves 97, 98 and 99, that are also shown in FIG. 4, can be independently activated. The radio controlled valves 97, 98, and 99 have three modes of operation. Firstly, these valves will permit the pressurized air to enter the balloon 28, pilot-valve 62 or 63; secondly, they will allow the air inside the balloon 28, and pilot-valves 62 and 63 to be purged out, and thirdly, they will close the air access to and from the balloon 28, the pilot valves 62, or 63.

Figure 5:
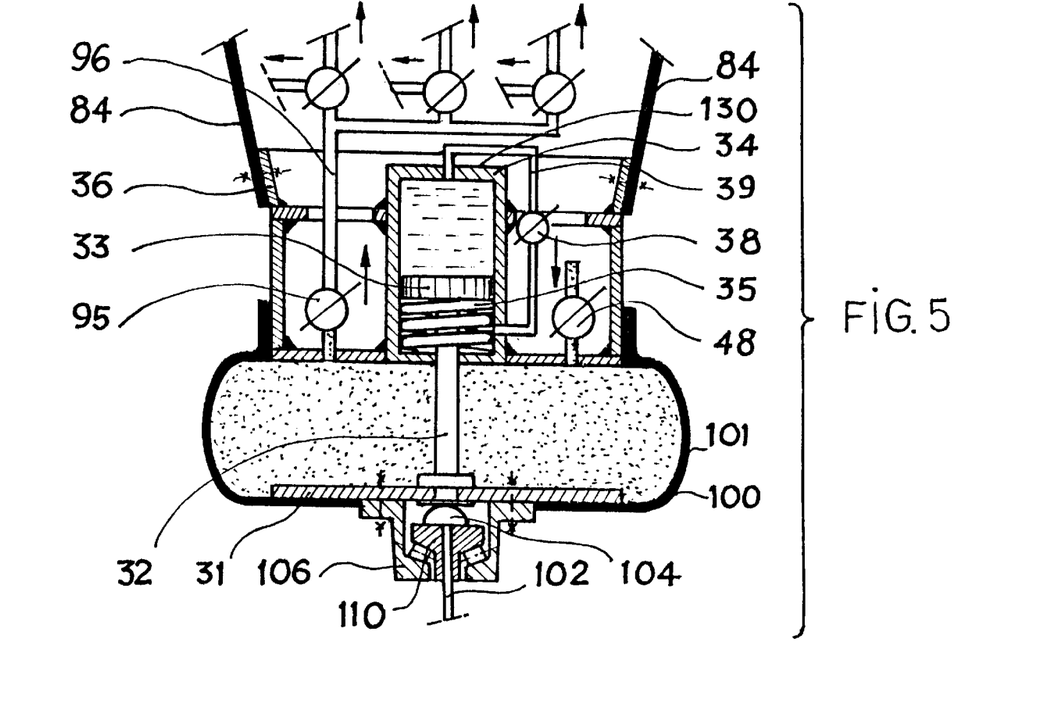
Figure 7:
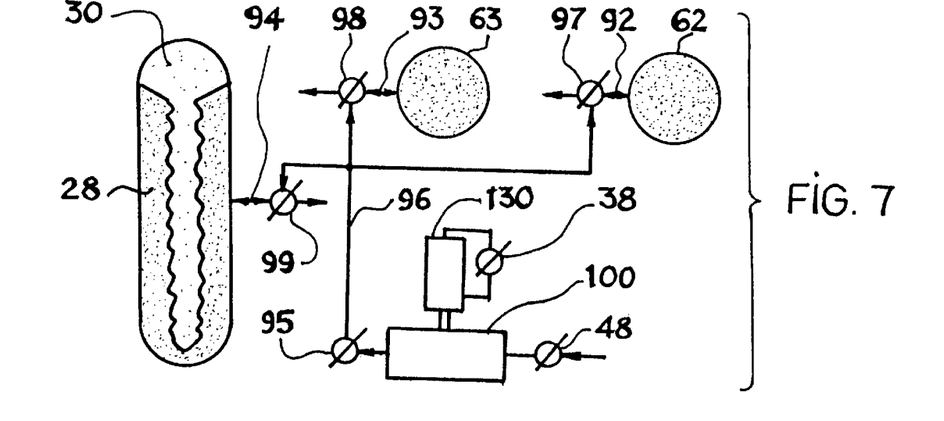

The air pump 100 is controlled by the air pump controller 130. The on/off valve 38, that is energized by remote radio, controls the movements of the piston 33 inside the cylinder 34, based on the direction of the prevailing force acting on the shaft 32. When the reel is un-reeled faster than the ascending speed of the air transport shuttle, the spring 35 will push up the piston 33 and shaft 32. The air contained in the air pump 100 is push through the one way valve 95 for distribution. When the reel's brake is applied, the inertia force of the apparatus is a bigger than the force spring 35 can deliver, and therefore the shaft 32 is moved toward its extreme down position. In this position the air is entering the pump 100 through a one way valve 48, as illustrated in FIGS. 4, 5 and 7. The hydraulic fluid inside the cylinder 34 acts as a shock absorber.

Figure 2:
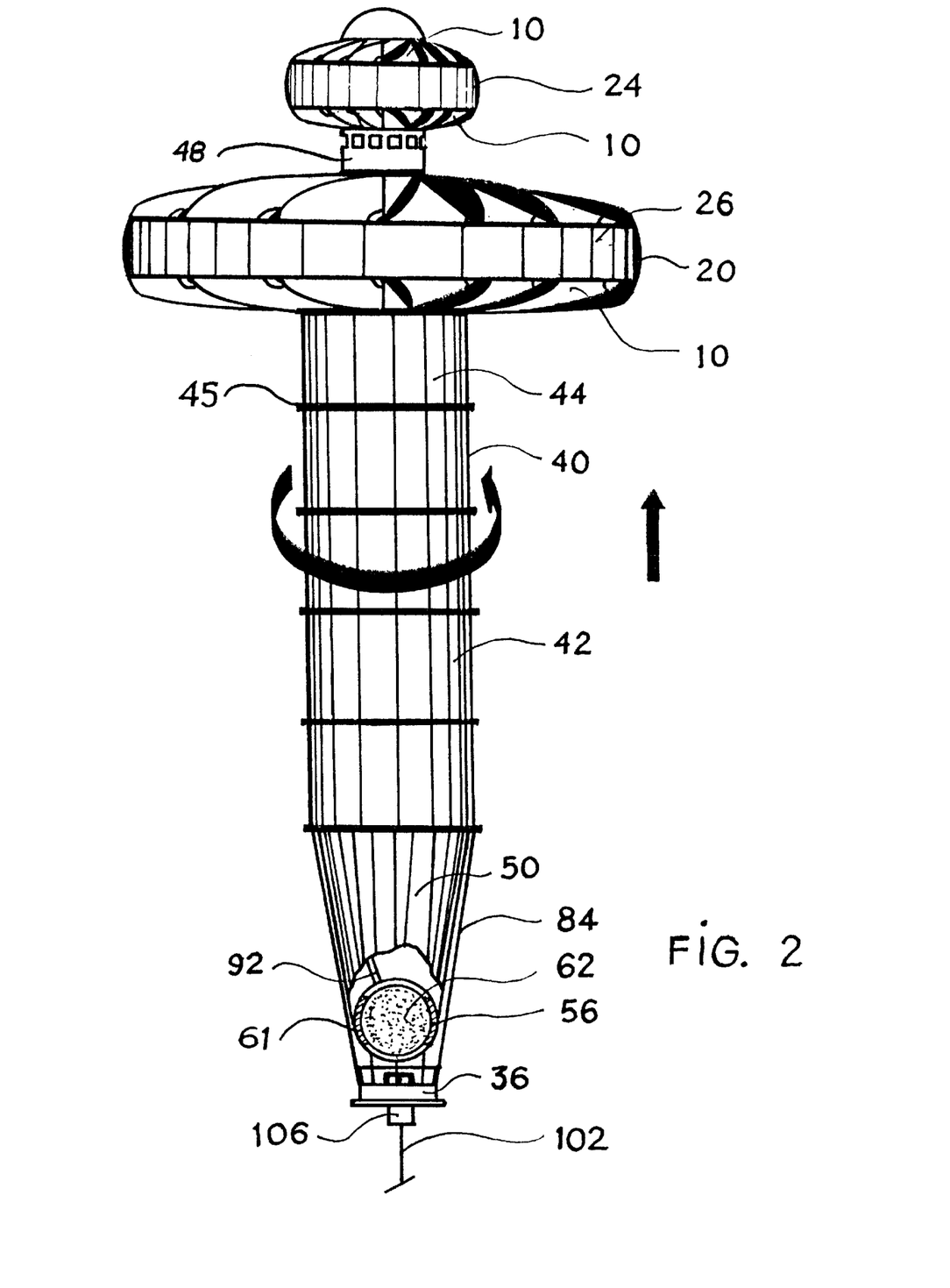
Figure 3:
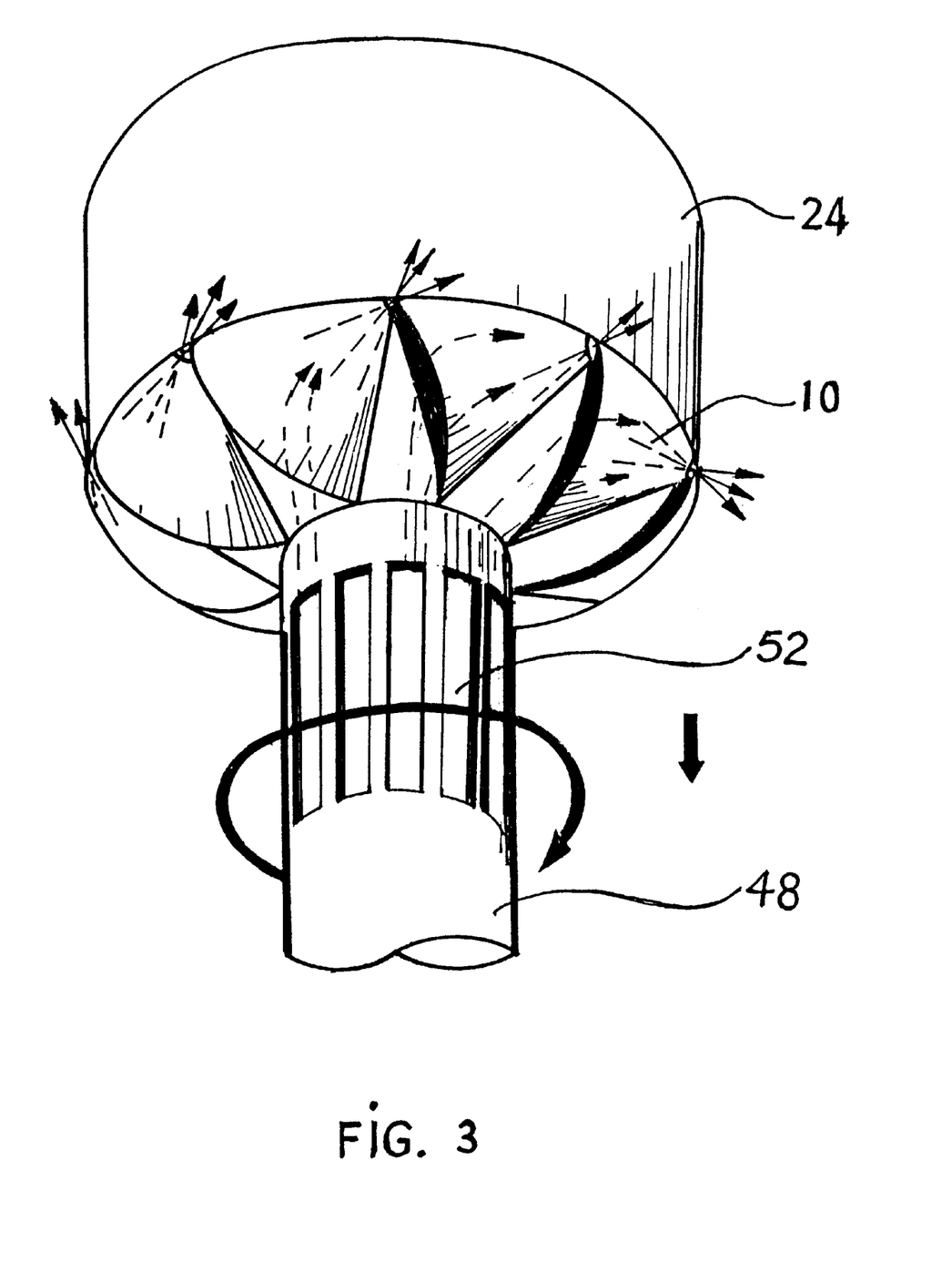

When the apparatus is in the air loading position, shown in FIG. 1, the air intake valve 56 and the air exhaust valve 58 are open, and the conical column 50 is extended inside the air shuttle's flexible structure 44. When the air transport shuttle starts to ascend the pilot-valves 62 and 63 will be inflated by the air pump 100, in order to close the air intake valve 56 and the air exhaust valve 58, and to seal the air transport shuttle 42. During the air transport shuttle ascending phase, the three-way valve 99 gradually purges the air balloon enclosure 28, to allow the suspending means 20 to compensate for the lower surrounding atmosphere pressure, and to expand the lighter than air gas into the cylindrical balloon 30. When the air transport shuttle 42 has reached the maximum air shuttling altitude, the conical column 50 will expend outside the air shuttle's flexible structure 44, for maximum volume, see FIG. 2. At this time, the three-way valve 97, will partially purge the pilot-valve 62, in order open the air intake valve 56, and evacuate the water droplets accumulated at the bottom of conical column 50. When the air transport shuttle starts to descend, the air pump 100 will inflate the pilot valve 62 and closed the air intake valve 56. During the descending period, the air pump 100 will constantly supply pressurized air to balloon enclosure 28 in order to squeeze the cylindrical balloon 30 and to return the lighter than air gas back to the auxiliary balloon enclosure 24, and to the ring balloon 26. When the air transport shuttle 42 has reached an altitude below the inversion layer, and is ready to release its thermal bubbles, the three way valves 97 and 98 are activated to purge pilot valves 62 and 63, and to open the air exhaust valve 58 and the air intake valve 56. The air entering the air transport shuttle will push the warmer air inside through the exhaust windows 52, and the auxiliary balloon enclosure 24 will help shaping a large diameter thermal bubble.

While the preferred embodiment is shown and described herein, another structure of size and shape may be substituted with equal ease, provided the same basic elements to place and vertically move the air transport shuttle in the atmosphere are used, and the separation of the water droplets is accomplished.

Furthermore, while the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

I claim:

1. An atmospheric inversion layer de-stabilizer apparatus comprising:
    a) a large diameter, tall, hollow air transport shuttle for loading and vertically transporting a volume of air between two different altitudes in the atmosphere, wherein said air transport shuttle further comprising at least one air intake valve, and at least one air exhaust valve that isolate the air transported inside said shuttle, from the surrounding atmosphere, and a volume expanding section that increases or decreases the volume of said air transport shuttle during its ascending or descending movements,
    b) a suspending means for elevating said air transport shuttle in the atmosphere, and
    c) an altitude control means for controlling the ascending and descending speed in the atmosphere of the said air transport shuttle.

2. An atmospheric inversion layer de-stabilizer apparatus comprising:
    a) a large diameter, tall, hollow air transport shuttle for loading and vertically transporting a volume of air between two different altitudes in the atmosphere, wherein said air transport shuttle further comprising at least one air intake valve, and at least one air exhaust valve that isolate the air transported inside said shuttle, from the surrounding atmosphere, and a volume expanding section that increases or decreases the volume of said air transport shuttle during its ascending or descending movements, wherein said air transport shuttle further comprising at least one air exhaust window, b) a suspending means for elevating said air transport shuttle in the atmosphere, and c) an altitude control means for controlling the ascending and descending speed in the atmosphere of the said air transport shuttle.

3. An atmospheric inversion layer de-stabilizer apparatus comprising:

a) a large diameter, tall, hollow air transport shuttle for loading and vertically transporting a volume of air between two different altitudes in the atmosphere, wherein said air transport shuttle further comprising at least one air intake valve, and at least one air exhaust valve that isolate the air transported inside said shuttle, from the surrounding atmosphere, and a volume expanding section that increases or decreases the volume of said air transport shuttle during its ascending or descending movements, wherein said air transport shuttle further comprising at least one air exhaust window, b) suspending means for elevating the said air transport shuttle in the atmosphere, herein said suspending means further comprising a ring balloon filled with lighter than air gas that has enough lifting power to elevate said air transport shuttle to a higher altitude, an auxiliary balloon enclosure that supplies additional lifting power and shapes the warm air exiting said air transport shuttle through said exhaust window into a large diameter air bubble, and a cylindrical balloon enclosure that compensate for the increase or decrease in volume of said lighter than air gas during the air transport shuttle's ascending or descending movements in the atmosphere, and c) an altitude control means for controlling the ascending and descending speed in the atmosphere of the said air transport shuttle.

4. An atmospheric inversion layer de-stabilizer apparatus comprising:

a) a large diameter, tall, hollow air transport shuttle for loading and vertically transporting a volume of air between two different altitudes in the atmosphere wherein said air transport shuttle further comprising at least one air intake valve and at least one air exhaust valve that isolate the air transported inside said shuttle, from the surrounding atmosphere, and a volume expanding section that increases or decreases the volume of said air transport shuttle during its ascending or descending movements, wherein said air transport shuttle further comprising at least one air exhaust window, b) suspending means for elevating the said air transport shuttle in the atmosphere, herein said suspending means further comprising a ring balloon filled with lighter than air gas that has enough lifting power to elevate said air transport shuttle to a higher altitude, an auxiliary balloon enclosure that supplies additional lifting power and shapes the warm air exiting said air transport shuttle through said exhaust window into a large diameter air bubble, and a cylindrical balloon enclosure that compensate for the increase or decrease in volume of said lighter than air gas during the air transport shuttle's ascending or descending movements in the atmosphere, herein said ring balloon and said auxiliary balloon enclosure further comprising gyro-sails that help rotate said air transport shuttle around a vertical axis during shuttle's vertical movements in the atmosphere, and c) an altitude control means for controlling the ascending and descending speed in the atmosphere of the said air transport shuttle, wherein said altitude control means further comprising a control platform provided with a cable that has a first end attached to said air transport shuttle, and a second end wound around a cable length control mechanism positioned on said control platform.

5. An atmospheric inversion layer de-stabilizer apparatus comprising:

a) a large diameter, tall, hollow air transport shuttle for loading and vertically transporting a volume of air between two different altitudes in the atmosphere, wherein said air transport shuttle further comprising at least one air intake valve, and at least one air exhaust valve, that, isolate the air transported inside said shuttle, from the surrounding atmosphere, b) a suspending means for elevating said air transport shuttle in the atmosphere, and c) an altitude control means for controlling the ascending and descending speed in the atmosphere of the said air transport shuttle.

* * * * *